April 7, 1953     G. J. MAGEAU, JR     2,634,018
SPECTACLE CASE
Filed Dec. 31, 1947
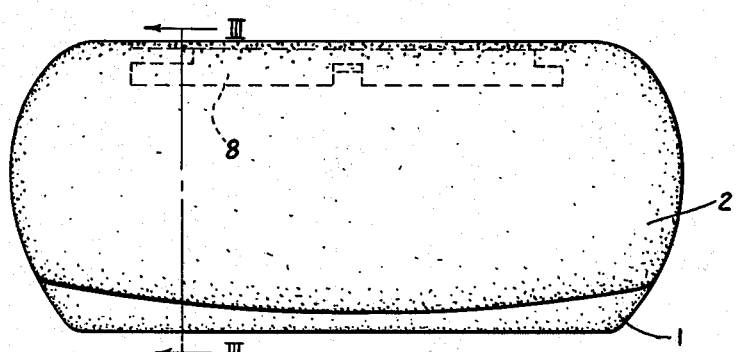
Fig. I
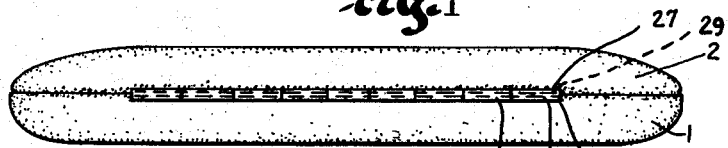
Fig. II
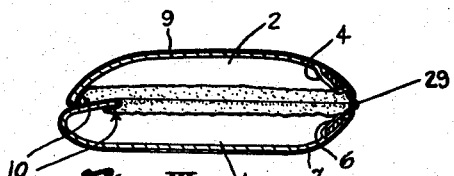
Fig. III
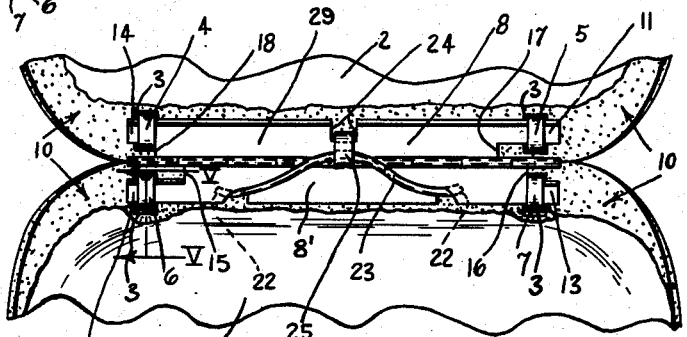
Fig. IV
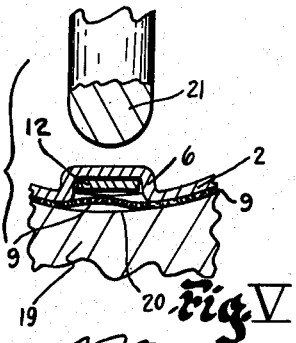
Fig. V
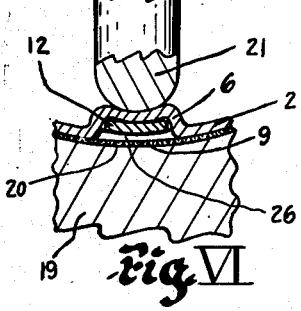
Fig. VI
INVENTOR
GEORGE J. MAGEAU JR.
BY
Louis L. Gagnon
ATTORNEY Patented Apr. 7, 1953

2,634,018

UNITED STATES PATENT OFFICE 2,634,018

SPECTACLE CASE

George J. Mageau, Jr., Fiskdale, Mass., assignor to American Optical Company, Southbridge, Mass., a voluntary association of Massachusetts Application December 31, 1947, Serial No. 794,883

4 Claims. (Cl. 220—31)

This invention relates to improvements in receptacles and has particular reference to an improved case for spectacles and eyeglasses.

One of the principal objects of the invention is to provide an improved spectacle or eyeglass case wherein the pocket portion, and the cover portion of the case may be formed to the required finished shape and be provided with the usual flexible covering material separately of each other and may thereafter be secured to a separate hinge member without in any way injuring the covering material.

Another object is to provide a spectacle or eyeglass case so constructed as to permit the use of a separate hinge member to which the cover portion and pocket portion may be quickly and easily attached and which will obviate most of the difficult and expensive hinge forming and case covering operations of the past.

Another object is to provide an improved eyeglass or spectacle case construction whereby the main pocket and cover portions of the case may be formed and covered separately of each other and thereafter attached to a separate hinge member in a simple and efficient manner whereby the hinge will be securely anchored and the covering material will overlie the entire edge of the pocket and cover and said edges will fit in relatively intimate relation with each other when the cover is in closed relation with the pocket.

Other objects and advantages of the invention will become apparent from the following description taken in connection with the accompanying drawing, and it will be apparent that changes may be made in the details of construction and arrangement of parts shown and described without departing from the spirit of the invention as expressed in the accompanying claims. I, therefore, do not wish to be limited to the exact details of construction shown and described as the preferred form only has been given by way of illustration.

Referring to the drawing:

Fig. I is a plan view of a case embodying the invention;

Fig. II is a rear elevational view of same;

Fig. III is a sectional view taken on line 3—3 of Fig. I;

Fig. IV is a fragmentary plan view of the case showing the hinge member in assembled relation with the pocket and cover portions;

Fig. V is an enlarged sectional view taken as on line V—V of Fig. IV and showing a step in the method of attaching the hinge member to the case; and Fig VI is a view similar to Fig. V showing a further step in the method of attaching the hinge member to the case.

Referring more particularly to the drawing wherein like characters of reference designate like parts throughout the several views, the device embodying the invention comprises a pocket portion 1 and a cover portion 2 adapted to be hingedly connected together. The pocket portion 1 and the cover portion 2 are formed from a sheet of material such as aluminum, steel, silver or any other suitable material and are first blanked out to the desired contour shapes and are then formed or cupped by pressing or the like.

The pocket portion 1 and the cover portion 2 are provided with integral elevated loops 4, 5, 6 and 7, which are struck out of the material by means of a suitable die or the like. The loops 4, 5, 6 and 7 are formed adjacent the edges which are adapted to be hingedly joined and are adapted to form supports or attachment means to which the separate hinge members 8 are secured.

After the parts have been properly shaped, and the elevated loops are formed, a flexible covering 9 of genuine leather, imitation leather, fibre, cloth or other suitable material is cut or otherwise formed to the desired contour shape and size and is secured throughout the entire outer area of the pocket portion 1 and the cover portion 2 by an adhesive or other suitable means in the usual manner. The pocket portion 1 and the cover portion 2 are provided with the flexible covering separately of each other. The covering 9 is turned inwardly of the pocket portion 1 and the cover portion 2 as shown at 10 in Figs. III and IV, throughout their peripheral edges, and has suitable openings 3 through which the loops 4, 5, 6, and 7 protrude. The turned in edges are secured by adhesive or other suitable means.

Each of the respective hinge members 8 and 8' are formed with one long reduced end portion or leg as illustrated at 11 and 12 and one short reduced portion or leg as illustrated at 13 and 14 at the opposed ends thereof. To assemble the hinge members 8 and 8' with the pocket portion and cover portion respectively the long end portion or leg 11 or 12, as the case may be, see Figure IV, is first inserted through the respective elevated loops 5 or 6 until the shoulders 15 or 17 contact said loop thereby allowing leg 13 or 14 to clear the lug 4 or 7. The hinge members 8 and 8' are then positioned or aligned so that the short legs 13 and 14 may be slid beneath the elevated loops 4 and 7 until the shoulders 16 and 18 contact said loops, thereby positioning said hinge members and pocket and cover portions in assembled relation.

The coverings 9 which, as described above, have a portion 10 overlying the contour edge and extending inwardly of the pocket and cover portions, will lie between the hinge plates and the adjacent walls of the pocket and cover portions.

The pocket and cover portions having the hinge members assembled therewith, as stated above, are then placed in die members 19, one of which is illustrated in Fig. V. The die member 19 has a supporting portion 20 shaped to the respective contour shape of the pocket or cover portion, to support said pocket or cover portion with the loops in aligned relation with suitable plungers 21, one of which is shown in the drawing. The plungers 21 are adapted to be forced downwardly into engagement with the looped portions as illustrated in Fig. VI to compress the loops and to anchor the legs of the hinge members 8 and 8' therein. The results from causing the loop portions to be bent or cupped inwardly while simultaneously causing the portion of the hinge legs lying within said looped portions to be bent or cupped as illustrated in Fig. VI and thereby rigidly anchor the hinge plates to the pocket and cover portions.

Referring to Figs. V and VI it is pointed out that the pressure applied by the plungers not only functions to pinch or squeeze the leg portions of the hinge plates between the loops but also has a tendency to iron out any looseness or sagging of the flexible cover on the exterior of the case. This results from the tendency of the loops to spread when struck and to thereby draw the material intermediate the ends of the loops taut.

If desired, in the space between the covering 9 and the leg of the hinge, as illustrated at 26 in Fig. VI, may be provided with a suitable filler prior to compressing the looped portions thereby providing means for preventing the outer covering material from flexing inwardly.

This filler may be made of plastic, synthetic resin, Bakelite, solder or any other suitable material having sufficient body and is placed in the recess either in a doughy state or as a separate filler piece or it may be melted and flowed therein with its outer surface flush with the adjacent surface of the pocket or cover.

The hinge plate secured to the pocket portion of the case is provided with recessed portions 22 in which the ends of a bar spring member 23 extend as illustrated in Fig. IV. The upper hinge plate attached to the cover portion is provided with an intermediate slot 24, the base of which forms a latch for receiving a resilient clip 25 which has a portion adapted to hook over the latch like edge of the recess 24 and a portion adapted to hook about the intermediate portion of the bar spring 23 thereby providing means to retain the cover in open or closed relation with the pocket portion.

This latter spring arrangement is of the conventional type employed in cases of this character and functions in the conventional manner. The case is provided with the usual lining of flexible material such as velvet or other flexible lining secured internally of the case by a suitable adhesive, cement or the like in the conventional manner. This lining is formed in one piece extending throughout the interior of the cover over the hinge member and throughout the interior of the pocket portion so that the hinge attachment means and spring actuating means are all concealed from view. The hinge plates are pivotally connected by the hinge pintle 29, extending through the spaced bearings 30 and 31.

It is pointed out that the cover portion and pocket portion are each provided with a longitudinally recessed edge 27 and 28 in which the pintle 29 of the hinge is positioned when being placed in assembled relation with said cover and pocket portion. It is to be understood that the flexible covering material is turned about said longitudinally recessed edges when the said flexible covering material is being placed on said cover and pocket portion. This provides a space for the hinge pintle while enabling the remaining contour edges of the pocket and cover portion to close in intimate relation with each other.

From the foregoing description, it will be seen that simple, efficient and economical means and methods have been provided for accomplishing all of the objects and advantages of the invention.

Having described my invention, I claim:

1. A device of the character described comprising a pocket member and a cover member therefor, said members each having a pair of spaced looped portions disposed along one side thereof, said looped portions having their opposed ends both joined with said side of the respective members, and a pair of plate-like members hingedly connected together and each having spaced projection-like portions lying substantially in the plane of the respective plate-like member, said projection-like portions being disposed beneath and anchored to said looped portions of the respective pocket and cover members.

2. A device of the character described comprising a pocket member and a cover member therefor, said members each having a pair of spaced portions struck from one side thereof in the form of a loop with the opposed ends of said looped portions being retained in integral connected relation with said side of the respective members, and a pair of plate-like members hingedly connected together and each having projection-like portions adjacent their opposed ends lying substantially in the plane of the respective plate-like member, said projection-like portions being disposed beneath and anchored to an adjacent looped portion of the respective pocket and cover members.

3. A device of the character described comprising a pocket member and a cover member therefor, said members each having a pair of spaced looped portions struck from one side thereof and disposed in aligned relation, said struck portions having their opposed ends in connected relation with said side of the respective members, and plate-like members overlying said side of each of the cover and pocket members with their main portion disposed intermediate said spaced looped portions of the side of the respective member, said plate-like members having their outer sides hingedly connected together and each having projection-like end portions disposed beneath and anchored to the adjacent looped portions struck from said sides of the respective pocket and cover members.

4. A device of the character described comprising a pocket member and a cover member therefor, said members each having a pair of spaced looped portions struck inwardly from the wall thereof and with their opposed ends in integral connected relation with said wall of the respective members, each of said members having a covering of flexible material on the outer surface, said flexible material being folded about the contour edge thereof and with a portion thereof overlying the inner surface of said members adjacent said contour edges, and a pair of plate-like members hingedly connected together and each overlying the turned-in portions of the flexible material and having spaced projection-like portions disposed beneath and anchored to said looped portions of the respective pocket and cover members.

GEORGE J. MAGEAU, Jr.

REFERENCES CITED

The following references are of record in the file of this patent:

UNITED STATES PATENTS

| Number | Name | Date |
|---|---|---|
| 871,144 | Reinhard | Nov. 19, 1907 |
| 897,983 | Kirby | Sept. 8, 1908 |
| 1,004,474 | Schrorr | Sept. 26, 1911 |
| 1,235,640 | Berry | Aug. 7, 1917 |
| 1,552,916 | Farrington | Sept. 8, 1925 |
| 1,740,866 | McBarron | Dec. 24, 1929 |
| 2,012,829 | Pratt | Aug. 27, 1935 |
| 2,070,827 | Dugdale | Feb. 16, 1937 |
| 2,433,483 | Root | Dec. 30, 1947 |

FOREIGN PATENTS

| Number | Country | Date |
|---|---|---|
| 297,181 | Great Britain | Sept. 20, 1928 |
| 361,568 | Great Britain | Nov. 26, 1931 |